May 24, 1955 R. FONT 2,709,226

HERMETICALLY SEALED CRYSTAL UNIT HAVING A VARIABLE AIR GAP

Filed May 20, 1952 2 Sheets-Sheet 1

INVENTOR.
RAMON FONT
BY Herman L. Gordon
ATTORNEY

HERMETICALLY SEALED CRYSTAL UNIT HAVING A VARIABLE AIR GAP

Filed May 20, 1952 2 Sheets-Sheet 2

INVENTOR.
RAMON FONT
BY Herman L. Gordon
ATTORNEY

United States Patent Office 2,709,226

Patented May 24, 1955

2,709,226

HERMETICALLY SEALED CRYSTAL UNIT HAVING A VARIABLE AIR GAP

Ramon Font, Richmond Hill, N. Y., assignor, by mesne assignments, to Premier Research Laboratories Inc., New York, N. Y., a corporation of New York Application May 20, 1952, Serial No. 288,900

11 Claims. (Cl. 310—9.3)

This invention relates to crystal units, and more particularly to a crystal unit of the hermetically sealed type.

A main object of the invention is to provide a novel and improved hermetically sealed crystal unit having a variable air gap, said crystal unit being simple in construction, being easy to manufacture, and which may be accurately adjusted to a desired oscillating frequency.

A further object of the invention is to provide an improved crystal unit of the hermetically sealed type, employing at least one electrode which may be adjusted relative to the vibratory crystal plate, so that the air gap between the plate and the electrode may be accurately set to a value providing a desired vibratory frequency of the crystal unit, prior to the final insertion of the crystal unit into its sealing container.

A still further object of the invention is to provide an improved hermetically sealed crystal unit of the variable air gap type, said crystal unit being especially suited for mass production techniques, the unit being arranged to provide a high degree of protection against mechanical injury to the crystal plate therein, and being further arranged to provide substantially positive electrical connections between the electrodes of the unit and the external contact terminals thereof.

A still further object of the invention is to provide an improved hermetically sealed crystal unit of the variable air gap type, said unit being inexpensive to manufacture, being rugged in construction, and being stable in performance.

Further objects and advantages of the invention will become apparent from the following description and claims, and from the accompanying drawings, wherein:

Figures 1, 2:
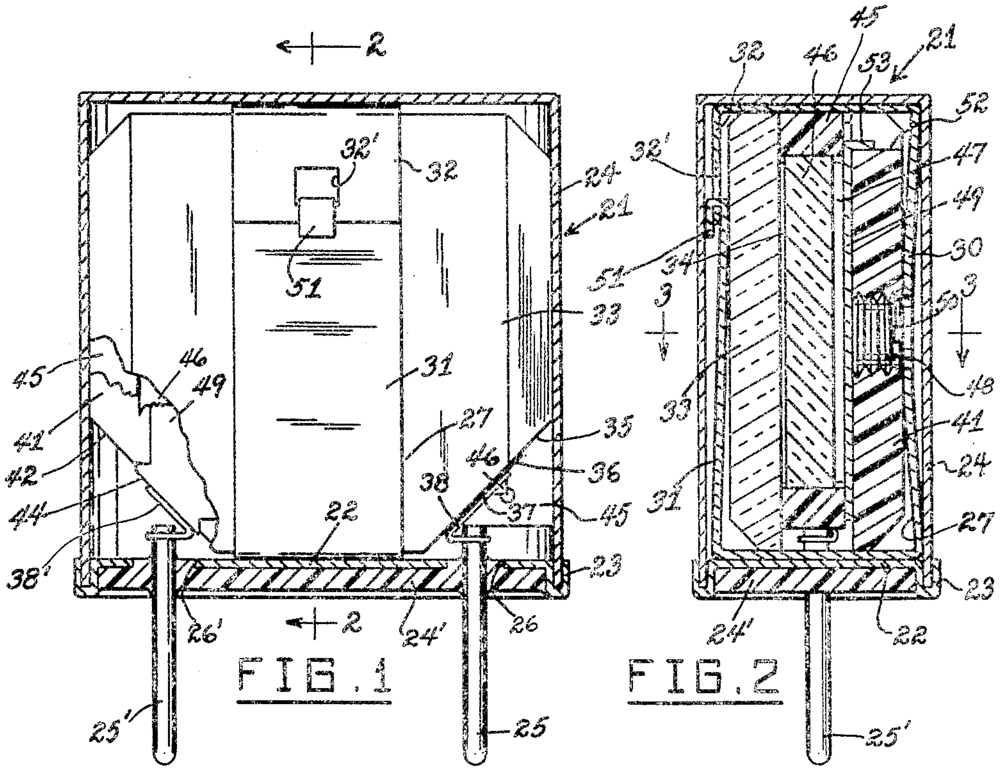
Figure 1 is a vertical cross-sectional view, with parts broken away, taken through an improved crystal unit constructed in accordance with the present invention.
Figure 2 is a vertical cross-sectional view taken on line 2—2 of Figure 1.
Figures 3, 4, 5:
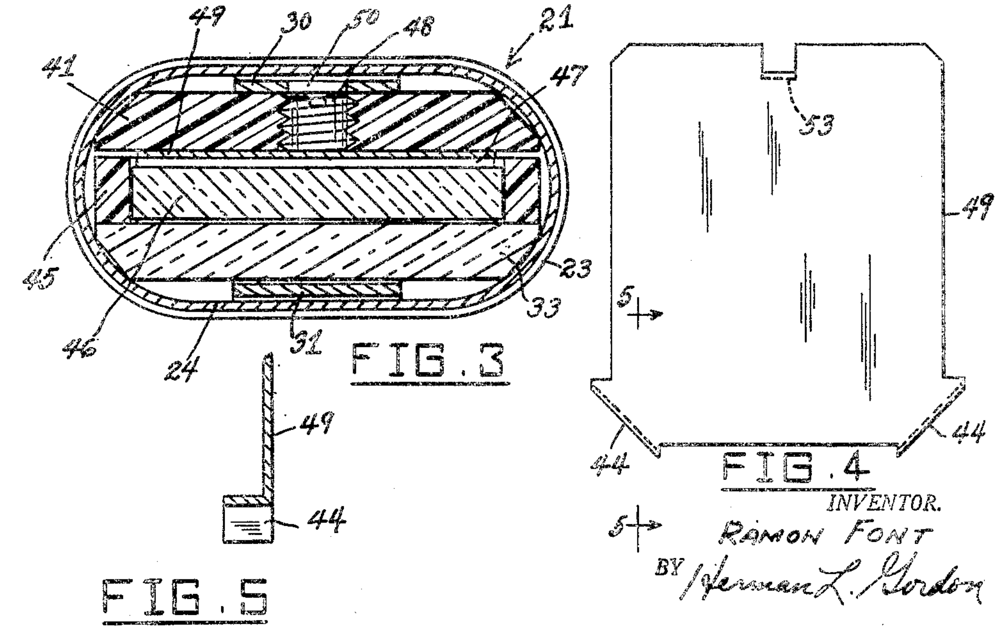
Figure 3 is a horizontal cross-sectional view taken on line 3—3 of Figure 2.
Figure 4 is an elevational detail view of the adjustable electrode employed in the crystal unit of Figures 1 to 3.
Figure 5 is a cross-sectional detail view taken on line 5—5 of Figure 4.
Figures 6, 7, 8, 9, 10, 11, 12, 13, 14, 15:
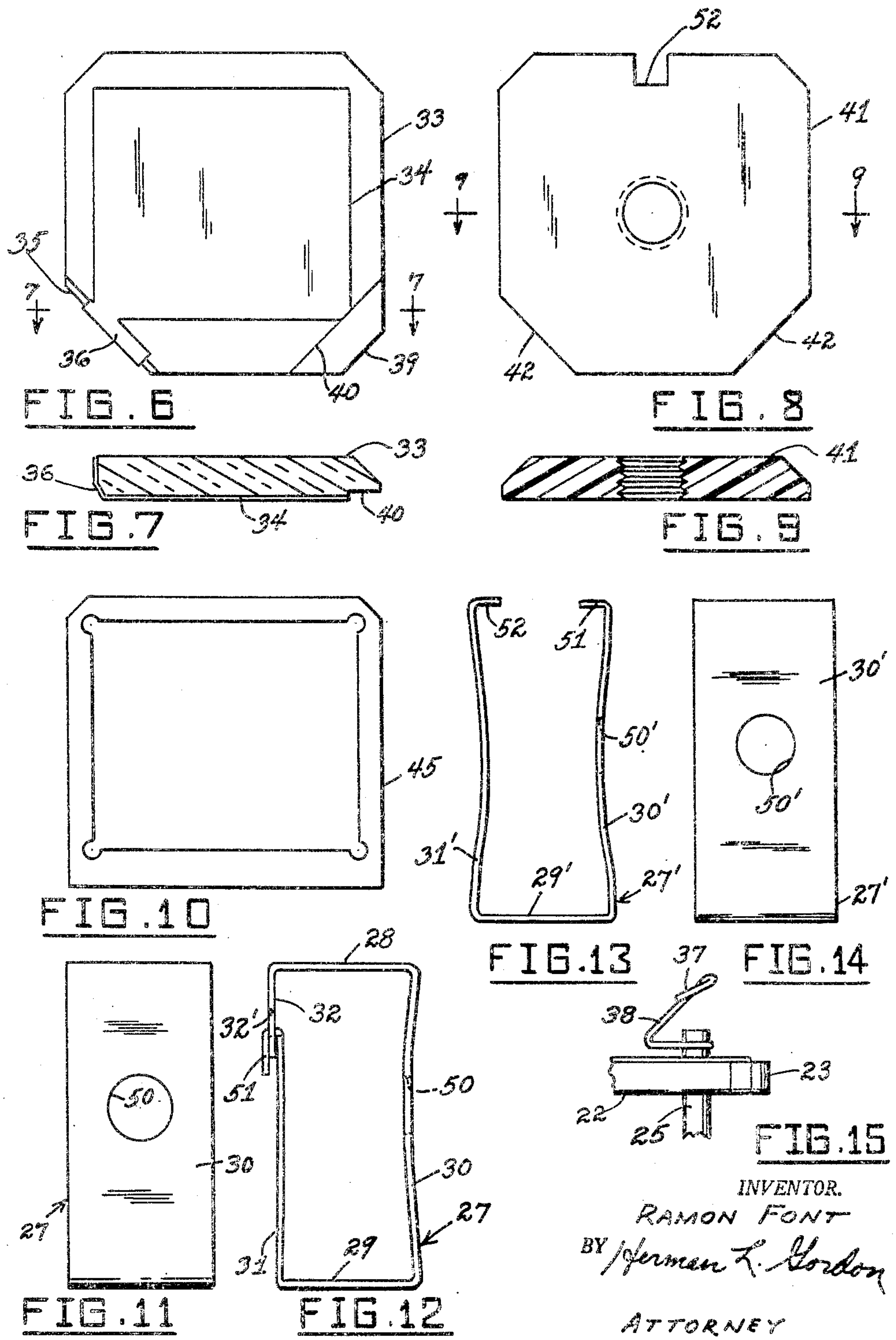
Figure 6 is an inside elevational view of the plated electrode employed in the crystal unit of Figures 1 to 3.
Figure 7 is a cross-sectional view taken on line 7—7 of Figure 6.
Figure 8 is an inside elevational view of the outer slab element employed adjacent the adjustable electrode in the crystal unit of Figures 1 to 3.
Figure 9 is a cross-sectional view taken on line 9—9 of Figure 8.
Figure 10 is a front elevational view of the crystal plate-supporting spacer frame employed in the crystal unit of Figures 1 to 3.
Figure 11 is a front elevational view of the retaining and cushioning spring employed in the crystal unit of Figures 1 to 3.
Figure 12 is a side elevational view of the spring of Figure 11.
Figure 13 is a side elevational view of a modified form of retaining and cushioning spring which may be employed in the crystal unit of the present invention.
Figure 14 is a front elevational view of the retaining and cushioning spring of Figure 14.
Figure 15 is an enlarged fragmentary elevational detail view of the top portion of one of the terminal prongs of the crystal unit of Figures 1 to 3, showing the electrode contact spring mounted on said top portion.

Referring to the drawings, and more particularly to Figures 1 to 3, one form of assembled crystal unit according to the present invention is designated generally at 21. Said unit comprises an elongated, generally oval base 22 formed around its periphery with the depending, upwardly facing continuous channel 23 adapted to receive the bottom rim of a housing member 24, said bottom rim being sealingly secured in channel 23 in any suitable manner, as by soldering, or the like. Designated at 25, 25' are respective terminal prongs sealingly and insulatingly secured in the respective end portions of base 22, as by being embedded in a mass of insulating material 24' provided in said base, the base being apertured at 26, 26' to allow the prongs 25, 25' to extend therethrough. The top ends of said prongs project a short distance above base 22, as shown in Figures 1, 2 and 15.

Designated at 27 is a generally rectangular loop member of flat spring metal, said loop member having the parallel top and bottom arms 28 and 29, connected by the outwardly concave resilient rear arm 30. The bottom arm 29 terminates in the upstanding, outwardly concave resilient front arm 31 and the top arm 28 terminates in the depending, relatively short front arm 32 to which the upper portion of arm 31 is secured, as by a tab 51 on the top end of arm 31 engaged through an aperture 32' in arm 32 and bent downwardly, as shown in Figures 2 and 12.

Designated at 33 is a generally rectangular slab of ceramic insulating material on which is deposited the plated electrode 34. Slab 33 is formed with a large bevel 35 at one lower corner, and the electrode plating is extended around said bevel 35 to define a contact surface 36 which is engaged by the resilient loop 37 at the end of the inclined arm 38 of an angularly bent piece of spring wire rigidly secured to the top end of the prong 25, as shown in Figure 15. If so desired, the arm 38 may be soldered to the contact surface 36 to provide a more positive connection therewith.

The opposite lower corner of the slab 33 is formed with a relatively small bevel 39, and is further reduced in thickness at 40 to provide clearance for the top end of the other prong 25'.

Designated at 41 is a second generally rectangular slab of insulating material, such as bakelite or the like, formed at the respective lower corners thereof with the large bevels 42, and formed at the intermediate portion of its top edge with a rectangular notch 52.

Disposed against the inside face of the slab 41 is a generally rectangular resilient metal electrode plate 49 formed at its lower corners with the contact tabs 44 which extend around the bevels 42. One of the tabs 44 is engaged by a resilient loop on the end of the inclined arm 38' of an angularly bent piece of spring wire secured to the top end of prong 25'. As in the case of the contact arm 38, the arm 38' may, if so desired, be soldered to the tab 44 to provide a more positive connection therewith. Plate 49 is formed at its top margin with the tongue 53 engaging in notch 52 of slab 41.

Interposed between the plate 49 and the plated slab 33 is a generally rectangular spacer frame 45 of insulating material which rests on the top ends of the prongs 25, 25'. Disposed in the spacer frame 45 is the crystal plate 46. The spacer frame 45 is of substantially greater thickness than the crystal plate 46, providing an air gap 47 between crystal plate 46 and the electrode plate 49. Said electrode plate overlaps the top and bottom arms of the spacer frame, but is preferably of less width than the inside width of the frame, so that the electrode plate may be readily flexed inwardly of the spacer frame, as will be presently described.

Threadedly mounted in the intermediate portion of the slab 41 is the air gap-adjusting screw 48 which is engageable with the intermediate portion of electrode plate 49, as shown in Figures 2 and 3. The rear arm 30 of member 27 is formed with an aperture 50 in registry with the screw 48, so that access to the slotted end of said screw may be had for adjusting the air gap 47 prior to final assembly of the crystal unit.

Figures 13 and 14 illustrate an alternative form of resilient outer retaining member 27' which may be employed in place of the member 27. Member 27' is generally U-shaped and comprises the inwardly bowed resilient rear arm 30', the inwardly bowed resilient front arm 31' and the flat bight portion 29' connecting the arms 30' and 31'. The arms 30' and 31' are formed at their top ends with the respective inturned lug elements 51 and 52 adapted to lockingly engage the top edges of the slabs 41 and 33 when the slabs and their intervening parts are mounted in the retaining member 27'. The rear arm 30' is formed with an aperture 50' which is registrable with the air gap-adjusting screw 48 when the parts are thus mounted.

It will be understood that the air gap is adjusted prior to final assembly of the unit, as by connecting the contact elements 36 and 44 in any suitable manner, as by the use of a suitable test jig, to a test oscillator, and rotating the screw 48 until the desired oscillator frequency is obtained.

After the proper air gap is set, the subassembly, comprising the slabs 33 and 41 and their intervening parts, mounted in the retaining member of either Figures 11 and 12 or Figures 13 and 14, is slipped into the housing member 24, and the base assembly is then secured to the bottom rim of the housing member, as above described, with the contact arm 38' engaging tab 44 and the contact arm 38 engaging the plated contact extension 36. Where the elements 38' and 38 are soldered to the elements 44 and 36, the housing member 24 is slipped over the above subassembly after the soldering operations have been performed. With this latter method of assembly, the air gap may be adjusted after the elements 38' and 38 have been soldered to the elements 44 and 36, and just prior to the final step of hermetically sealing the assembly.

While certain specific embodiments of an improved crystal unit of the hermetically sealed type have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A crystal assembly comprising a base, a pair of contact prongs extending through and secured in said base, a first electrode connected to one of the prongs, a second electrode connected to the other of the prongs, a crystal-retaining member interposed between the electrodes and resting on the prongs, means arranged to adjustably deflect a portion of one of the electrodes relative to the other electrode, and retaining means clampingly embracing the electrodes.

2. A crystal assembly comprising a base, a pair of contact prongs extending through and secured in said base, an electrode connected to one of the prongs, a flexible electrode plate connected to the other of the prongs, a crystal-retaining member interposed between the electrode and electrode plate and resting on the prongs, a rigid slab member disposed adjacent said electrode plate, a movable adjusting element mounted on said slab member and being engageable with a portion of said flexible electrode plate, said element being arranged to deflect said portion relative to the electrode, whereby the spacing between said portion and said electrode may be varied, and retaining means clampingly embracing said electrode and slab member.

3. A crystal assembly comprising a base, a pair of contact prongs extending through and secured in said base, a rigid electrode connected to one of the prongs, a flexible electrode plate connected to the other of the prongs, a crystal-retaining member interposed between the electrode and electrode plate and resting on the prongs, a rigid slab member disposed adjacent said electrode plate, an adjusting screw threadedly mounted in said slab member and being engageable with a portion of said flexible electrode plate, said screw being arranged to adjustably deflect said portion relative to the electrode, whereby the spacing between said portion and said electrode may be varied, and retaining means clampingly embracing said electrode and slab member.

4. A crystal unit comprising a base, a pair of contact prongs extending through and secured in said base, a rigid electrode connected to one of the prongs, a flexible electrode plate connected to the other of said prongs, a crystal-retaining member interposed between the electrode and electrode plate and resting on the prongs, a crystal plate disposed in said crystal-retaining member, a rigid slab member disposed adjacent said electrode plate, an adjusting screw threadedly mounted in said slab member and being engageable with a portion of said flexible electrode plate, said screw being arranged to adjustably deflect said portion relative to the electrode, whereby the spacing between said portion and said electrode may be varied, retaining means clampingly embracing said electrode and slab member, and a housing disposed over said retaining means and secured to said base.

5. The structure of claim 4, and wherein said crystal-retaining member is a rectangular frame.

6. The structure of claim 4, and wherein said crystal-retaining member is a rectangular frame and wherein said flexible electrode plate overlaps the top and bottom portions of said frame.

7. In a crystal assembly, a rigid electrode, a flexible electrode arranged substantially parallel to said rigid electrode, a crystal-retaining member interposed between the electrodes, a rigid slab disposed adjacent the flexible electrode and supportingly engaging a substantial portion of the surface thereof, and an adjusting element movably mounted on said rigid slab and being engageable with a portion of the flexible electrode to adjustably deflect said last-named portion relative to the rigid electrode.

8. In a crystal assembly, a rigid electrode, a flexible electrode arranged substantially parallel to said rigid electrode, a crystal-retaining member interposed between the electrodes, a rigid slab disposed adjacent in the flexible electrode, and supportingly engaging a substantial portion of the surface thereof, and a screw threadedly mounted on said rigid slab and being engageable with a portion of the flexible electrode to adjustably deflect said last-named portion relative to the rigid electrode.

9. In a crystal assembly, a rigid electrode, a flexible electrode, a crystal-retaining member interposed between the electrodes, a rigid slab disposed adjacent the flexible electrode and supportingly engaging a substantial portion of the surface thereof, a screw threadedly mounted on said rigid slab and being engageable with a portion of the flexible electrode to adjustably deflect said last-named portion relative to the rigid electrode, and retaining means clampingly embracing the rigid electrode and the slab.

10. The structure of claim 9, and wherein the crystal-retaining member is a rectangular frame.

11. The structure of claim 9, and wherein the crystal-retaining member is a rectangular frame and wherein the flexible electrode overlaps the top and bottom arms of the frame.

References Cited in the file of this patent

UNITED STATES PATENTS

| | | |
|---|---|---|
| 2,115,145 | Koerner | Apr. 26, 1938 |
| 2,458,987 | Fruth | Jan. 11, 1949 |

FOREIGN PATENTS

| | | |
|---|---|---|
| 924,113 | France | Mar. 3, 1942 |
| 598,954 | Great Britain | Mar. 2, 1948 |